(12) United States Patent
McCormack et al.

(10) Patent No.: US 9,098,263 B2
(45) Date of Patent: Aug. 4, 2015

(54) DATABASE APPLICATION ASSEMBLY AND PREPARATION

(75) Inventors: Michael J. McCormack, Snohomish, WA (US); Timothy E. Getsch, Redmond, WA (US); Andrew R. Miller, Issaquah, WA (US); Peter D. Mullen, Mercer Island, WA (US); Clinton D. Covington, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1578 days.

(21) Appl. No.: 11/742,356

(22) Filed: Apr. 30, 2007

(65) Prior Publication Data

US 2008/0270985 A1    Oct. 30, 2008

(51) Int. Cl.
*G06F 9/44*    (2006.01)

(52) U.S. Cl.
CPC ....................................... *G06F 8/30* (2013.01)

(58) Field of Classification Search
USPC ......................................... 717/120, 165, 107
See application file for complete search history.

(56) References Cited

U.S. PATENT DOCUMENTS

| | | | |
|---|---|---|---|
| 5,548,749 A | 8/1996 | Kroenke et al. | |
| 5,806,060 A | 9/1998 | Borgida et al. | |
| 5,826,257 A | 10/1998 | Snelling | |
| 5,892,510 A | 4/1999 | Lau et al. | |
| 5,920,866 A | 7/1999 | Crim | |
| 5,933,820 A * | 8/1999 | Beier et al. ............................. | 1/1 |
| 5,966,716 A | 10/1999 | Comer et al. | |
| 6,093,215 A * | 7/2000 | Buxton et al. ................ | 717/107 |
| 6,151,608 A | 11/2000 | Abrams | |
| 6,349,404 B1 * | 2/2002 | Moore et al. .................. | 717/104 |
| 6,507,855 B1 | 1/2003 | Stern | |
| 6,526,423 B2 | 2/2003 | Zawadzki | |
| 6,604,100 B1 | 8/2003 | Fernandez et al. | |
| 6,618,736 B1 | 9/2003 | Menage | |
| 6,868,413 B1 | 3/2005 | Grindrod et al. | |
| 7,010,546 B1 | 3/2006 | Kolawa et al. | |
| 7,020,660 B2 | 3/2006 | Woodring | |
| 7,240,073 B2 | 7/2007 | Benson et al. | |
| 7,269,593 B2 | 9/2007 | Minamino et al. | |
| 7,287,218 B1 | 10/2007 | Knotz et al. | |
| 7,302,444 B1 | 11/2007 | Dunmore | |

(Continued)

OTHER PUBLICATIONS

Dai, W., et al.; "Reusable Template for Product Database Development"; http://ieeexplore.ieee.org/xpl/freeabs_all.jsp?tp=&arnumber=571215&isnumber=12290; 0-7803-3280-06/96; Publ. 1996 IEEE; pp. 994-997.

(Continued)

*Primary Examiner* — Hang Pan
(74) *Attorney, Agent, or Firm* — Damon Rieth; Jim Ross; Micky Minhas

(57) ABSTRACT

A plurality of database application components available in a first components store is received. A plurality of pointers is created with each of the plurality of pointers referencing a selected object, such as the plurality of database application components or an existing pointer to one of the plurality of database application components. The plurality of pointers is collected into a reference group defining a plurality of selected objects included in a database application. In some examples, the database application components include a header, a footer, a control, a fragment, a table, a query, a report, a relation, a form, a conditional formatting statement, a programming component, a validation statement and a module.

20 Claims, 14 Drawing Sheets

(56) References Cited

U.S. PATENT DOCUMENTS

| | | | |
|---|---|---|---|
| 7,376,891 B2 | 5/2008 | Hitchock | |
| 7,549,116 B1 | 6/2009 | Garcowski et al. | |
| 7,610,548 B1 | 10/2009 | Brinkman et al. | |
| 7,711,675 B2* | 5/2010 | Anonsen | 707/759 |
| 7,725,501 B1* | 5/2010 | Stillman et al. | 707/805 |
| 7,761,848 B1* | 7/2010 | Chaffin | 717/116 |
| 7,801,886 B1 | 9/2010 | Gabriel et al. | |
| 7,870,164 B2 | 1/2011 | Miller et al. | |
| 2002/0054155 A1 | 5/2002 | Churchill et al. | |
| 2003/0036925 A1 | 2/2003 | Miller | |
| 2003/0115176 A1 | 6/2003 | Bobroff | |
| 2004/0036722 A1 | 2/2004 | Warren | |
| 2004/0078288 A1 | 4/2004 | Forbis et al. | |
| 2004/0093596 A1 | 5/2004 | Koyano | |
| 2004/0153462 A1 | 8/2004 | Bardwell | |
| 2004/0243550 A1 | 12/2004 | Gu et al. | |
| 2005/0065942 A1 | 3/2005 | Diab | |
| 2005/0066050 A1 | 3/2005 | Dharamshi | |
| 2005/0149545 A1 | 7/2005 | Zenz | |
| 2005/0171863 A1 | 8/2005 | Hagen | |
| 2005/0172221 A1 | 8/2005 | Kobashi et al. | |
| 2005/0207635 A1 | 9/2005 | Lazar et al. | |
| 2005/0223022 A1 | 10/2005 | Weissman et al. | |
| 2005/0262108 A1 | 11/2005 | Gupta | |
| 2006/0005127 A1 | 1/2006 | Ferguson et al. | |
| 2006/0036998 A1* | 2/2006 | McKenna et al. | 717/120 |
| 2006/0074936 A1 | 4/2006 | Behrens | |
| 2006/0095833 A1 | 5/2006 | Orchard et al. | |
| 2006/0117294 A1* | 6/2006 | Vogler | 717/104 |
| 2006/0167760 A1 | 7/2006 | Chakraborty et al. | |
| 2006/0167860 A1 | 7/2006 | Eliashberg et al. | |
| 2006/0197982 A1 | 9/2006 | Bell et al. | |
| 2006/0277209 A1* | 12/2006 | Kral et al. | 707/102 |
| 2007/0038651 A1 | 2/2007 | Bernstein et al. | |
| 2007/0038924 A1 | 2/2007 | Beyer et al. | |
| 2007/0038929 A1 | 2/2007 | Miyazawa | |
| 2007/0038948 A1 | 2/2007 | Cornacchia | |
| 2007/0041545 A1 | 2/2007 | Gainsboro | |
| 2007/0055943 A1 | 3/2007 | McCormack et al. | |
| 2007/0088741 A1 | 4/2007 | Brooks et al. | |
| 2007/0094340 A1 | 4/2007 | Zondervan et al. | |
| 2007/0100471 A1 | 5/2007 | Kumar et al. | |
| 2007/0112825 A1 | 5/2007 | Cook et al. | |
| 2007/0192671 A1 | 8/2007 | Rufener | |
| 2007/0198564 A1 | 8/2007 | Blackstone et al. | |
| 2007/0203925 A1 | 8/2007 | Sandler et al. | |
| 2007/0299823 A1 | 12/2007 | Getsch | |
| 2008/0065634 A1 | 3/2008 | Krinsky | |
| 2008/0065978 A1 | 3/2008 | Francker et al. | |
| 2008/0077552 A1 | 3/2008 | Sanborn | |
| 2008/0082495 A1 | 4/2008 | Polo-Malouvier et al. | |
| 2008/0091709 A1 | 4/2008 | Chang et al. | |
| 2008/0098291 A1 | 4/2008 | Bradley et al. | |
| 2008/0127186 A1 | 5/2008 | Kanodia et al. | |
| 2008/0288301 A1 | 11/2008 | Emling et al. | |
| 2009/0132576 A1 | 5/2009 | Miller et al. | |
| 2009/0158134 A1 | 6/2009 | Wang et al. | |
| 2009/0204635 A1 | 8/2009 | McCormack et al. | |
| 2009/0235164 A1 | 9/2009 | Wason | |
| 2009/0248740 A1 | 10/2009 | McCormack et al. | |
| 2010/0036676 A1 | 2/2010 | Safdi et al. | |
| 2010/0153834 A1 | 6/2010 | Abe | |
| 2012/0066692 A1 | 3/2012 | Jia | |

OTHER PUBLICATIONS

Chaudhry, N., et al.; "A Formal Model for Rule Inheritance and Overriding in Active Object-Oriented Databases"; Publ. 1998; 8 pgs.

Everything2.com; "Inheritance in Relational Databases"; http://www.everything2.com/index.pl?node_id=1796637; Apr. 2, 2006; 4 pgs.

Microsoft Business Solutions for Analytics-Great Plains, Jun. 2003, pp. 1-16 http:/ldownload.microsoft.comldownloadl4/8/8/4884dcc2-bd71-4286-bfb 7-e1360bb38a87/GreatPlains_Analytics.pdf.

BEA Weblogic Workshop Help. Verrsion 8.1 SP4, Dec. 2004, pp. 1-180. http:/ 1 edocs.bea.comiworkshop/docs81/pdf/files/portal/PortalJSPTags .pdf.

Sing Li: "Client and Server-Side Templating with Velocity", Jun. 13, 2004, pp. I-S http://www.developertutorials.comltutorials/java/templating-with-velocity/page2.html.

Primasoft PC: "Digital Document Manager" httQ:llwww.programurl.com/digital-document-manager.htm, Jul. 17, 2007, pp. 1-3.

U.S. Official Action dated Feb. 23, 2010 cited in U.S. Appl. No. 11/942,963, 12 pgs.

U.S. Official Action dated Jul. 23, 2010 cited in U.S. Appl. No. 11/942,963, 10 pgs.

U.S. Official Action dated Jun. 8, 2011 cited in U.S. Appl. No. 12/417,508, 24 pgs.

U.S. Official Action dated Jun. 22, 2011 cited in U.S. Appl. No. 12/417,429, 15 pgs.

U.S. Official Action dated Oct. 14, 2011 cited in U.S. Appl. No. 12/417,508, 22 pgs.

U.S. Official Action dated Dec. 23, 2011 cited in U.S. Appl. No. 12/417,429, 18 pgs.

U.S. Official Action dated Jul. 12, 2012 cited in U.S. Appl. No. 12/417,508, 32 pgs.

U.S. Official Action dated Sep. 18, 2012 cited in U.S. Appl. No. 12/417,429, 23 pgs.

U.S. Official Action dated Mar. 21, 2013 cited in U.S. Appl. No. 12/417,429, 20 pgs.

U.S. Official Action dated May 22, 2014 cited in U.S. Appl. No. 12/417,429, 20 pgs.

* cited by examiner

DATABASE APPLICATION ASSEMBLY AND PREPARATION

BACKGROUND

The creation of database applications often uses components that are common to other database applications, such as tables, queries, forms, reports, logic, and relationships. In some cases, these components are shared without modification, while in other cases these components may differ slightly between different database applications. In many cases, the modifications applied to a database application component for its use in one database application will transform the component into a form useful to other database applications. Each time the modified component is to be included within a different database application, the same set of changes must be reapplied. This leads to multiple opportunities for the introduction of typographical errors, omissions, or other mistakes in the creation of the database application.

Once a database application has been created, updating the related database application components presents several situations in which errors may be introduced. For example, after a database application component is included within multiple database applications, the component may later need to be modified to correct for errors and thus each database that includes the component must be modified. In addition to needing to correct errors in database application components, database application components are often updated or improved. To preserve a consistent user experience, the user interfaces and functionality of database application components should remain consistent through each database application. To maintain this consistency, each database application and its application components would have to be individually updated.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is directed to methods, systems, and computer-readable media for generating database applications and database application templates. Generally, a components store includes available database application components. An assembler creates database application entries that contain references to database application components within the components store. The database application entries may also include transforms to describe modifications to the referenced database application components. The assembler generates a database application that includes copies of the referenced database application components, which have been modified in accordance with the transforms. A template generator may then process the database application to generate a database application template.

In an implementation of a computer-implemented method, a first list of a plurality of database application components available in a first components store is received. A plurality of pointers is created. Each of the plurality of pointers references a selected object, such as the plurality of database application components or an existing pointer to one of the plurality of database application components. The plurality of pointers is collected into a reference group defining a plurality of selected objects included in a database application.

In another implementation of a computer-implemented method, a first list of database application components available in a first components store is received. A plurality of direct pointers each referencing one of the database application components is created. A plurality of indirect pointers is created, each of which references one of the plurality of direct pointers. The plurality of direct pointers is grouped into a first reference group. The plurality of indirect pointers to the direct pointers of the first reference group is collected into a second reference group. A first database application is defined that includes the application components referenced by the plurality of the indirect pointers in the second reference group.

In a further implementation of a computer-implemented method, a first list of database application components available in a first components store is received. A plurality of direct pointers is created, each of which references a database application component. A plurality of indirect pointers also is created, each of which references a direct pointer or another indirect pointer. A plurality of the direct pointers is grouped into a first reference group. A plurality of the indirect pointers to the direct pointers of the first reference group is grouped into a second reference group. A first database application that includes the referenced application components of the second reference group is defined.

In an implementation of a computer readable storage medium, instructions are stored to receive a group of database application components. A set of rules is received to define standards to which the database application components should comply. A determination is made whether each of the database application components of the group conform to the set of rules. When a database application component does not conform to a rule, when the rule is a correctable rule, the database application component is modified to conform to the rules. On the other hand, when the rule is not a correctable rule, a warning is provided that the database application component does not conform to the rules.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

In the drawings, like numerals represent like components. In addition, the first digit in each three-digit reference numeral and the first two digits in each four-digit reference numerals refer to the figure in which the referenced component first appears.

DETAILED DESCRIPTION OF IMPLEMENTATIONS

This detailed description describes implementations of a system for generating database applications and database application templates. Generally, a components store includes available database application components. An assembler creates database application entries that contain references to database application components within the components store. The database application entries may also include transforms that describe modifications to the referenced database application components. The assembler generates a database application that includes copies of the referenced database application components, which have been modified in accordance with the transforms. A template generator may then process the database application to generate a database application template.

Illustrative Operating Environment

Figure 1:
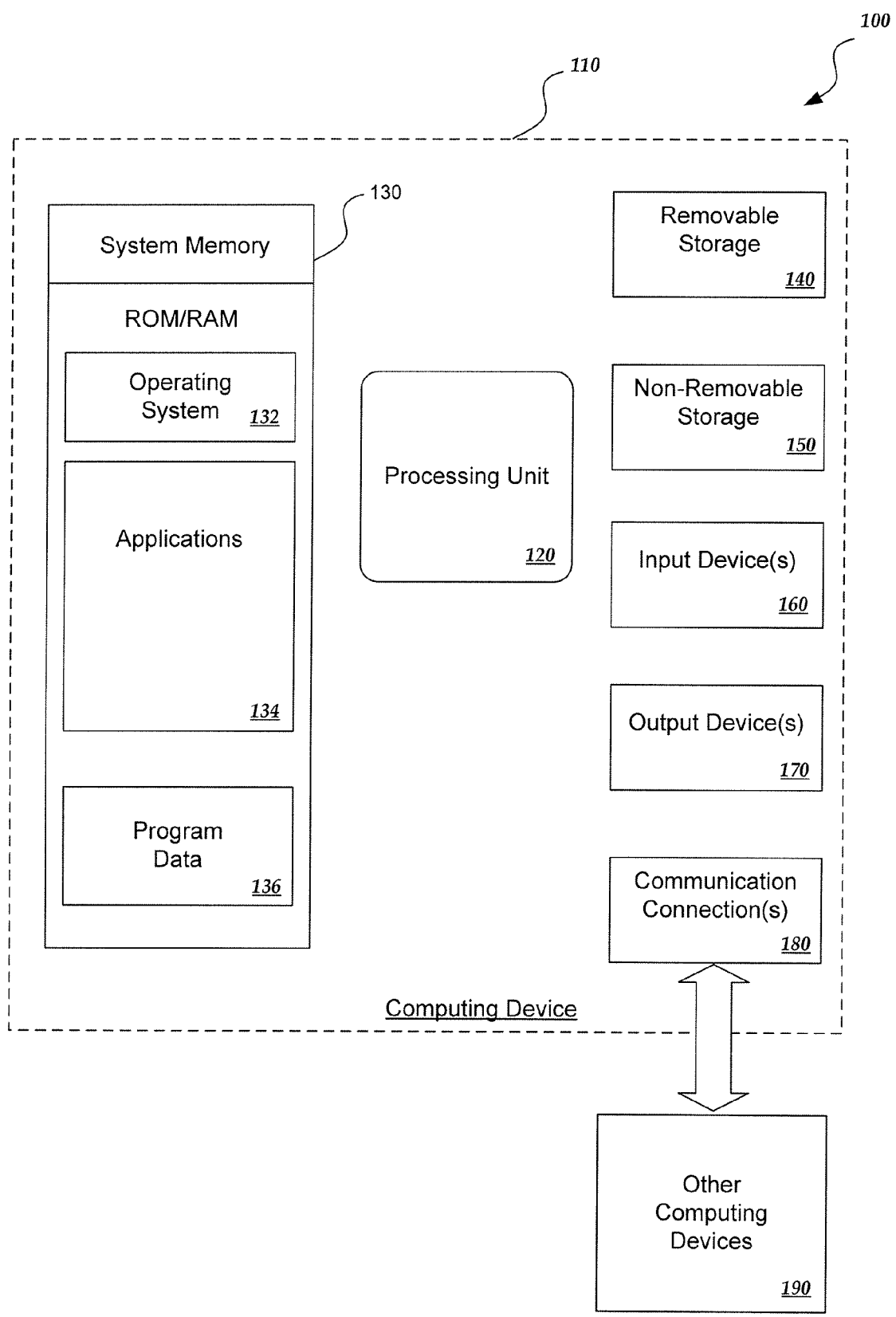
FIG. 1 is a block diagram of an operating environment for implementations of computer-implemented methods as herein described.

Implementations of creating database applications and application templates may be supported by a number of electronic or computerized devices to generate the database applications and application templates, either locally or over a network. FIG. 1 is a block diagram of a representative operating environment 100.

Referring to FIG. 1, an implementation of an operating environment 100 includes a computing device, such as a computing device 110. In a basic configuration, the computing device 110 may include a stationary computing device or a mobile computing device. The computing device 110 typically includes at least one processing unit 120 and system memory 130. Depending on the exact configuration and type of computing device, the system memory 130 may be volatile (such as RAM), non-volatile (such as ROM, flash memory, and the like), or some combination of the two. The system memory 130 typically includes an operating system 132, one or more applications 134, and may include program data 136.

The computing device 110 may also have additional features or functionality. For example, the computing device 110 may also include additional data storage devices (removable and/or non-removable) such as, for example, magnetic disks, optical disks, tape, or nonvolatile memory cards. Such additional storage is illustrated in FIG. 1 by removable storage 140 and non-removable storage 150. Computer storage media may include volatile and non-volatile media and removable and non-removable media implemented in any method or technology for storage of information, such as computer readable instructions, data structures, program modules or other data. The system memory 130, the removable storage 140, and the non-removable storage 150 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 110. Any such computer storage media may be a component of the computing device 110. The computing device 110 may also have input device(s) 160 such as a keyboard, mouse, pen, voice input device, touch input device, etc. Output device(s) 170 such as a display, speakers, printer, etc., may also be included.

The computing device 110 also contains communication connection(s) 180 that allow the device to communicate with other computing devices 190, such as over a network or a wireless network. The communication connection(s) 180 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. The term computer readable media as used herein includes both storage media and communication media.

System for Generating Database Application Templates

Figure 2:
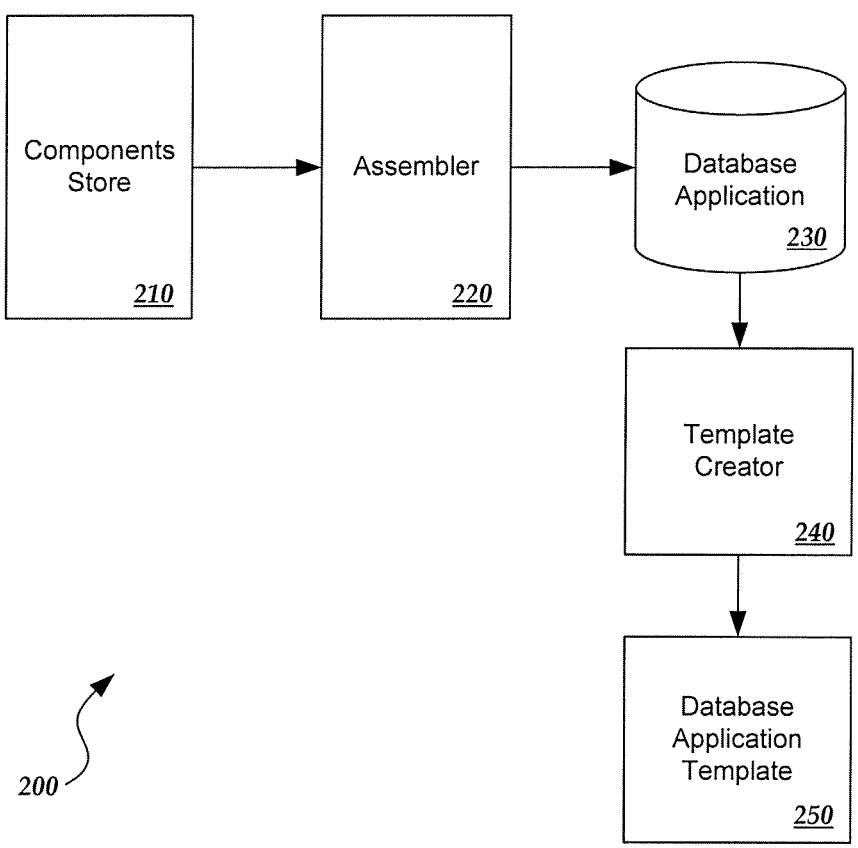
FIGS. 2 and 3 are block diagrams illustrating implementations of a system for generating a database application template.

FIG. 2 shows an implementation of a system 200 for generating a database application template. The system 200 includes a components store 210 that includes a plurality of available database application components. The components store 210 may include various types of database application components, such as data storage, schemas, headers, footers, controls, fragments, tables, queries, reports, relations, forms, conditional formatting statements, programming components, validation statements, modules, and/or any other component of a database application. The components store 210 is coupled to an assembler 220. The assembler 220 includes logic to combine database application components from the components store 210, into a database application 230. A database application may be supported by a database manager, such as SQL (Structured Query Language) Server of Microsoft Corporation of Redmond, Wash. A database application may be built from different database application components that control the display of information, such as a user interface; that provide information to the database application, such as a data store; that direct operation, such as forms, queries, relations and logic, or any other component known to those of ordinary skill in the art. The assembler 220 may create multiple different database applications 230 based on multiple different selections of components from the components store 210. The assembler 220 may use individual components included within the components store 210 multiple times to create multiple different database applications. Alternatively, the assembler 220 may not use some of the components included within the components store 210. As described in more detail below, the assembler 220 may also modify the components that are included within the database application 230.

The database application 230 created by the assembler 220 is then processed by a template creator 240. The template creator 240 includes logic to create a database application template 250 based on the database application 230. The final database application template 250 may then be used by a user to create a series of specific database applications, as needed.

Figure 3:
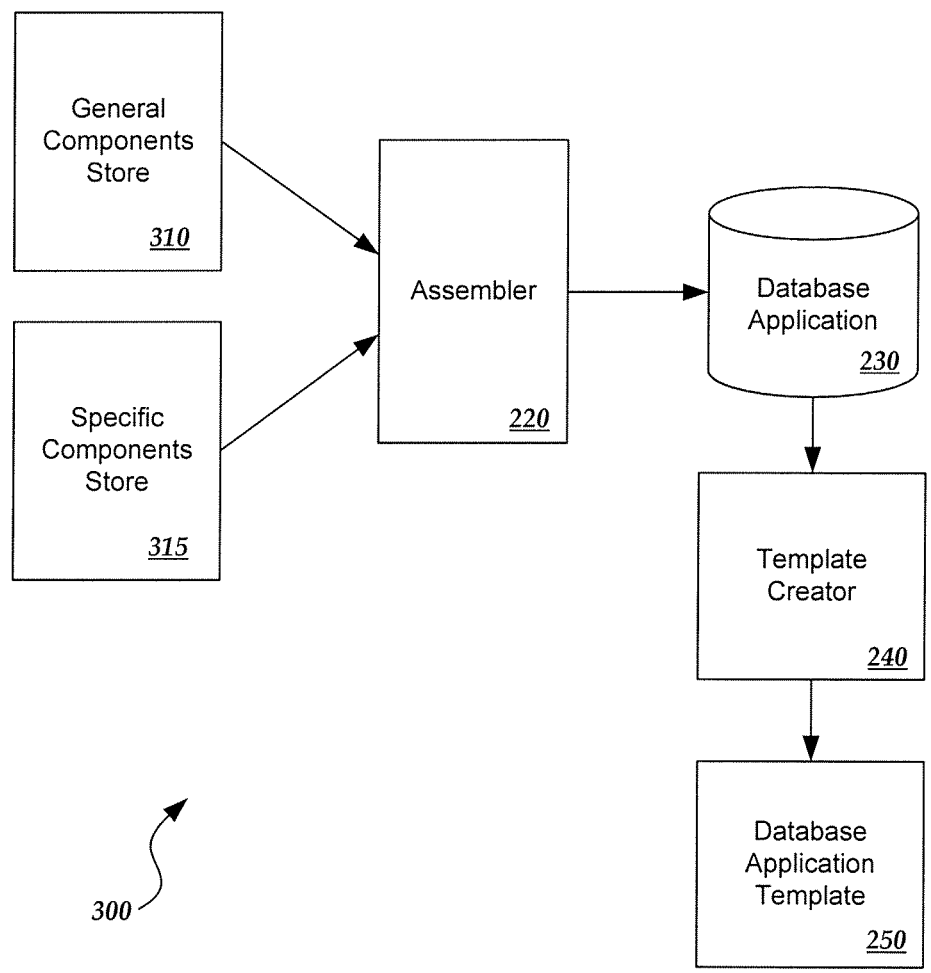

FIG. 3 shows an alternative implementation of a system 300 for generating a database application template. The system 300, in contrast to the system 200 (FIG. 2), includes two components stores: a general components store 310 and a specific components store 315. Rather than storing all of the database application components in a single components store, multiple components stores are used by the system 300.

Components that may be reused by multiple different database applications may be stored in the general components store 310. Components that are specific to a particular database application may be stored in a specific components store 315 that is related to the database. Because the available application components may allow for the creation of multiple databases, there may be multiple specific components stores 315. In this manner, the storage of the reusable components may be separated from the storage of the application specific components. This creates a more efficient storage system and allows the individual components stores to be more easily manipulated and managed.

Figure 4:
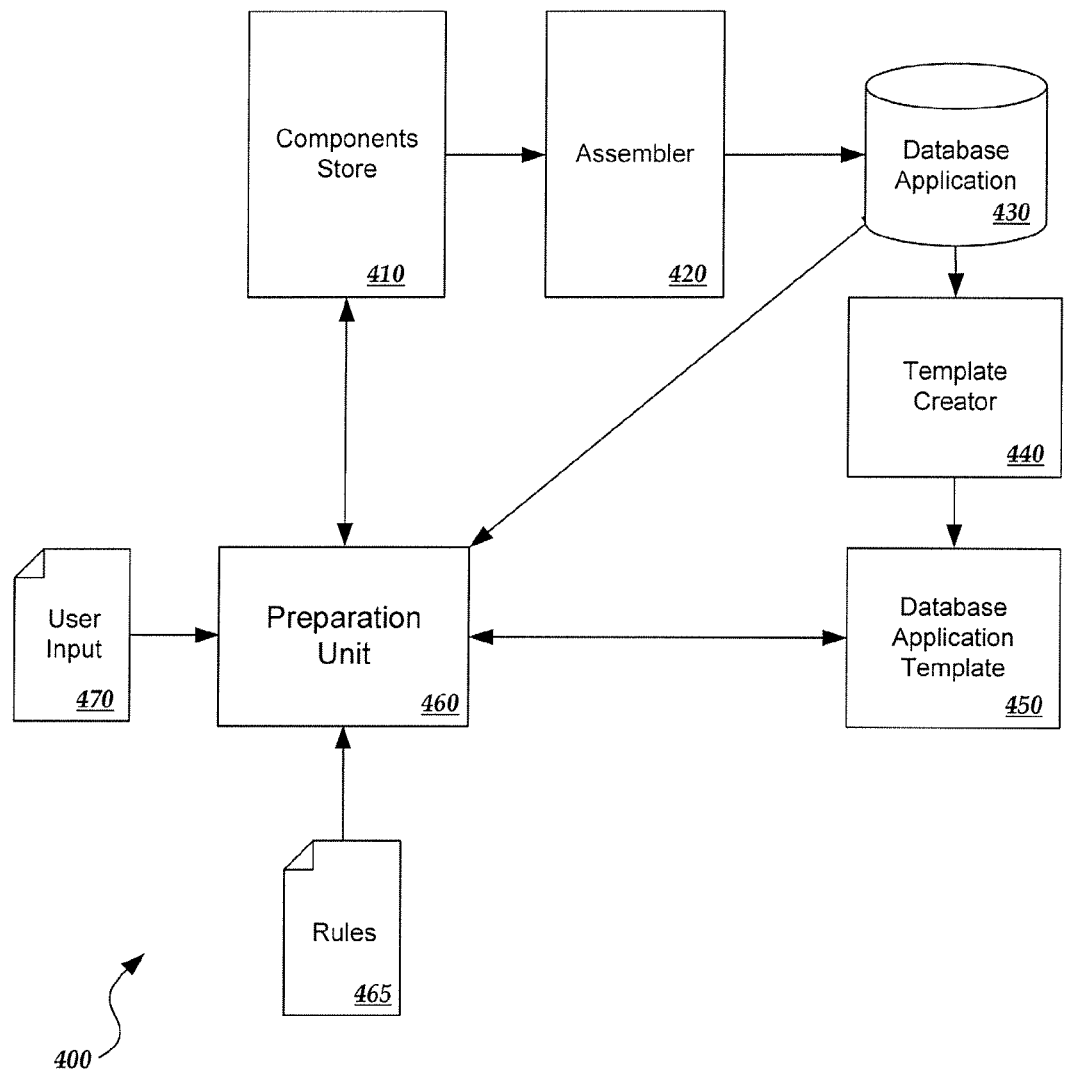
FIG. 4 is a diagram illustrating an implementation of a system for generating a database application template that includes a preparation unit.

FIG. 4 shows an implementation of a system 400 for generating a database application template that includes a preparation unit 460. The system 400 includes a components store 410 that includes a plurality of available database application components. The components store 410 is coupled to an assembler 420 and the preparation unit 460. The assembler 420 combines database application components from the components store 410 into a database application 430. The database application 430 created by the assembler 420 is coupled to a template creator 440 and the preparation unit 460. The template creator 440 creates a database application template 450 based on the database application 430. The final database application template 450 is also coupled to the preparation unit 460.

The preparation unit 460 may be coupled to any source containing database application components. For example, the components store 410 includes the available database application components and, therefore, is coupled to the preparation unit 460. The database application 430 includes database application components that are combined to create a database application and, therefore, is coupled to the preparation unit 460. The template 450 similarly includes database application components and, therefore, is also coupled to the preparation unit 460.

The preparation unit 460 receives a set of rules 465 that define standards to which database application components should comply. The rules 465 may include standards for any aspect of the database application components. For example, the rules 465 may define standards for formatting, functionality, and style. The rules 465 may include rules with a variety of different scopes. For example, some rules may apply to specific types of database application components, such as forms, reports and tables. Other rules may only apply to specific sections within database application components, such as only to header text, body text, or footer text. Still other rules may apply to all database application components.

The rules 465 may also include instructions to correct database application components that do not conform to the rules 465. The rules 465 may include priority information that defines the importance of specific rules and when identified errors should be corrected. For example, the rules 465 may be prioritized as rules requiring that a nonconforming component must be fixed, rules specifying that a nonconforming component should be fixed, rules indicating that a nonconforming component may be fixed, and rules specifying that a nonconforming component need only be flagged. The preparation unit 460 may modify database application components that do not satisfy the rules 465. For example, if a rule specifies that database application components must display text in blue, and a database application component displays text in red, the preparation unit 460 may change the font color from blue to black so that the rule is satisfied. These modifications may be implemented in response to rule priority.

The preparation unit 460 receives user input 470 that defines the manner in which rules are applied. In some implementations, the user input 470 may define what rules are turned on or what rules are turned off. Rules that are turned on may be applied to the database application components while rules that are turned off are ignored. Further, the user input 470 may also define the location to which the rules are applied. For example, the user input 470 may command the preparation unit 460 to apply the rules to the database application components stored within the components supply 410, to apply the rules to the database application 430, or to apply the rules to the template 450. The user input 470 also may control any other aspect of the application of the rules to the database application components. For example, the user input 470 may restrict the type of database application components to which the rules apply, the order in which the rules are applied, or any other standard control of rules known to those of ordinary skill in the art.

In response to an application of the rules 465 to database application components, the preparation unit 460 may identify errors. In some implementations, the preparation unit 460 may then create an error report including a pass or fail result of each of the rules 465. In addition, in response to the type of rule, the preparation unit 460 may correct the identified error. For example, if the preparation unit 460 identifies within the components store 410 a correctable error that is classified as "must fix," the preparation unit 460 corrects the identified error within the components store 410.

System for Generating Database Applications

Figure 5:
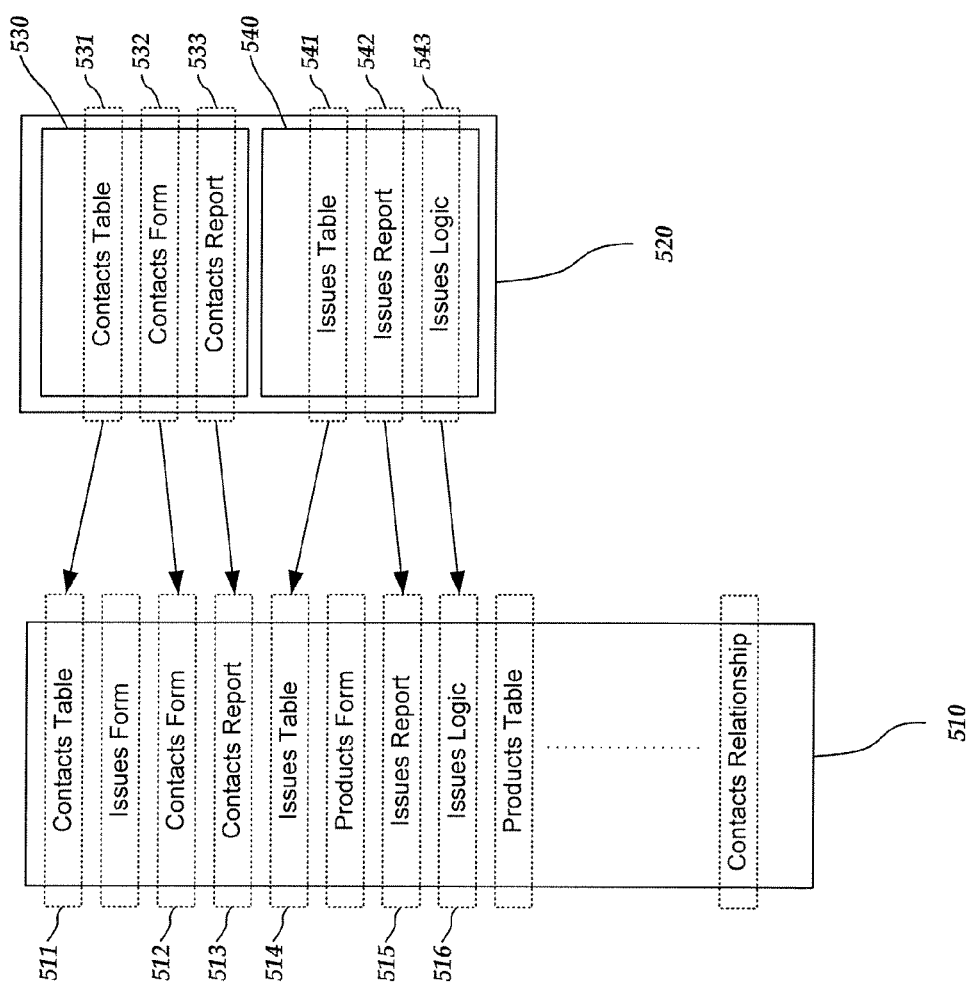
FIGS. 5-9 are block diagrams illustrating implementations of systems for generating a database application.

FIG. 5 shows an implementation of a system for generating database applications. A components store 510 is coupled to an assembler 520. The components store 510 includes a plurality of individual database application components relating to a plurality of individual databases, such as a database of contact information, a database of issues, and a database of products. For example, the components store 510 includes a contacts table component 511 for maintaining information about people. The components store 510 includes a contacts form component 512 for receiving input data about people. The components store 510 includes a contacts report component 513 that includes information defining a report about people that may be generated. The components store 510 includes an issues table component 514 for displaying data related to problem and concerns that should be addressed. The components store 510 includes an issues report component 515 that may be generated from data related to the problems and concerns. The components store 510 includes an issues logic component 516 that provides a set of preprogrammed commands to be applied to the problems and concerns. The components store 510 also includes many other database application components that relate to many different databases.

The components store 510 is coupled to the assembler 520. References to individual database application components of the components store 510 are included within the assembler 520. These references are grouped together to form database application frameworks. A framework is a structure that contains information describing a database application. These frameworks may be used by the assembler 520 to generate specific database applications that include copies of the database application components to which the frameworks reference.

In this implementation, the assembler 520 includes a contacts database application framework 530 that defines a database application relating to contacts. The assembler 520 also includes an issues database application framework 540 that defines a database application relating to issues. In other implementations, any number of database application frameworks may be constructed by the assembler 520.

The assembler 520 constructs a database application framework by creating references to each database application component that is to be included in the output database application. For example, the contacts database application framework 530 contains a contacts table entry 531. The contacts table entry 531 includes a pointer to the contacts table component 511 of the components store 510. The contacts database application framework 530 also contains a contacts form entry 532. The contacts form entry 532 includes a pointer to the contacts form component 512 of the components store 510. Thus, a copy of the contacts form 512 will also be included in the output contacts database. Similarly, the contacts database application framework 530 also contains a contacts report entry 533. The contacts report entry 533 includes a pointer to the contacts report component 513 of the components store 510. Thus, a copy of the contacts report component 513 will also be included in the output contacts database.

The assembler 520 also includes the issues database application framework 540. The database application framework 540 defines a database application based on three components of the components store 510 that relate to issues. The issues database application framework 540 includes an issues table entry 541, an issues report entry 542, and an issues logic entry 543. The entries 541-543 include pointers that reference the issues table component 514, the issues report component 515, and the issues logic component 516, respectively, of the components store 510. Thus, the issues database application framework 540 defines an output database application that includes the issues table 514, the issues report 515 and the issues logic 516. When the assembler 520 creates the issues database application, the assembler 520 will copy each of the issues related components 514-516 from the components store 510 into an output issues database application.

Figure 6:
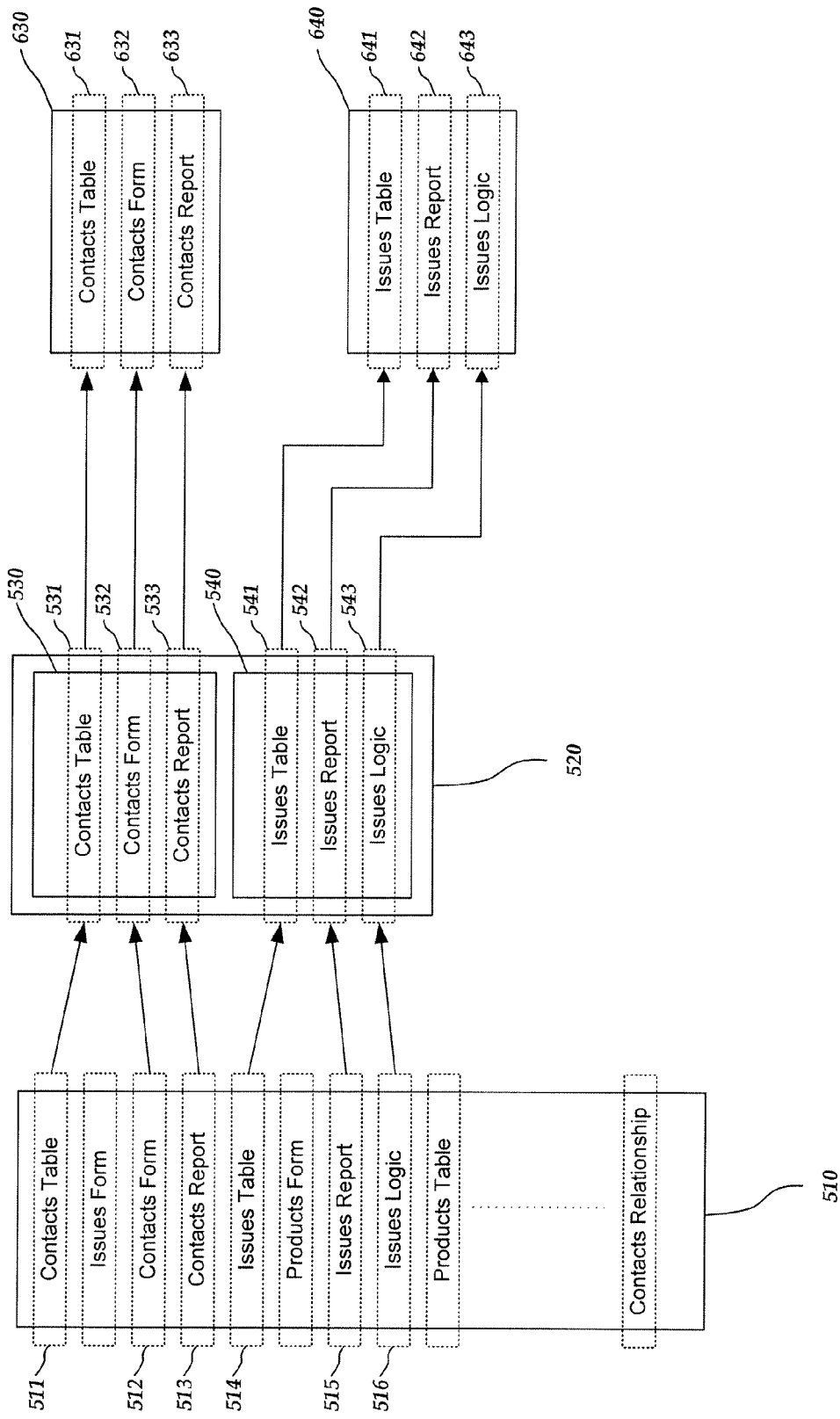

FIG. 6 shows an implementation of the components store 510 and the assembler 520 creating a contacts database application 630 and an issues database application 640. To create the contacts database application 630, the assembler 520 copies from the components store 510 the components 511-513 referenced by the three entries 531-533 of the contacts database application framework 530 into the contacts database application 630. During this process, the assembler transforms the components referenced in the components store 510 into database application components of the contacts database application 630. For example, the contacts table entry 531 of the contacts database application framework 530 includes a pointer to the contacts table component 511. A contacts table copy 631 is thus created and included within the contacts database application 630 by copying the contacts table component 511 of the components store 510. Similarly, a contacts form copy 632 and a contacts report copy 633 are created and included within the contacts database application 630 by copying the contacts form component 512 and the contacts report component 513, respectively, from the components store 510.

To create the issues database application 640, the three components 514-516 referenced by the three entries 541-543 of the issues database application framework 540 are copied from the components store 510 into the issues database application 640. For example, the issues table entry 541 includes a pointer to the issues table component 514. An issues table copy 641 is thus created and included within the issues database application 640 by copying the issues table component 514 of the components store 510. Similarly, an issues report copy 642 and an issues logic copy 643 are created and included within the issues database application 640 by copying the issues report component 515 and the issues logic component 516, respectively, from the components store 510. In this manner, the speed of application development is improved through the use of a reusable component library from which to build database solutions.

Figure 7:
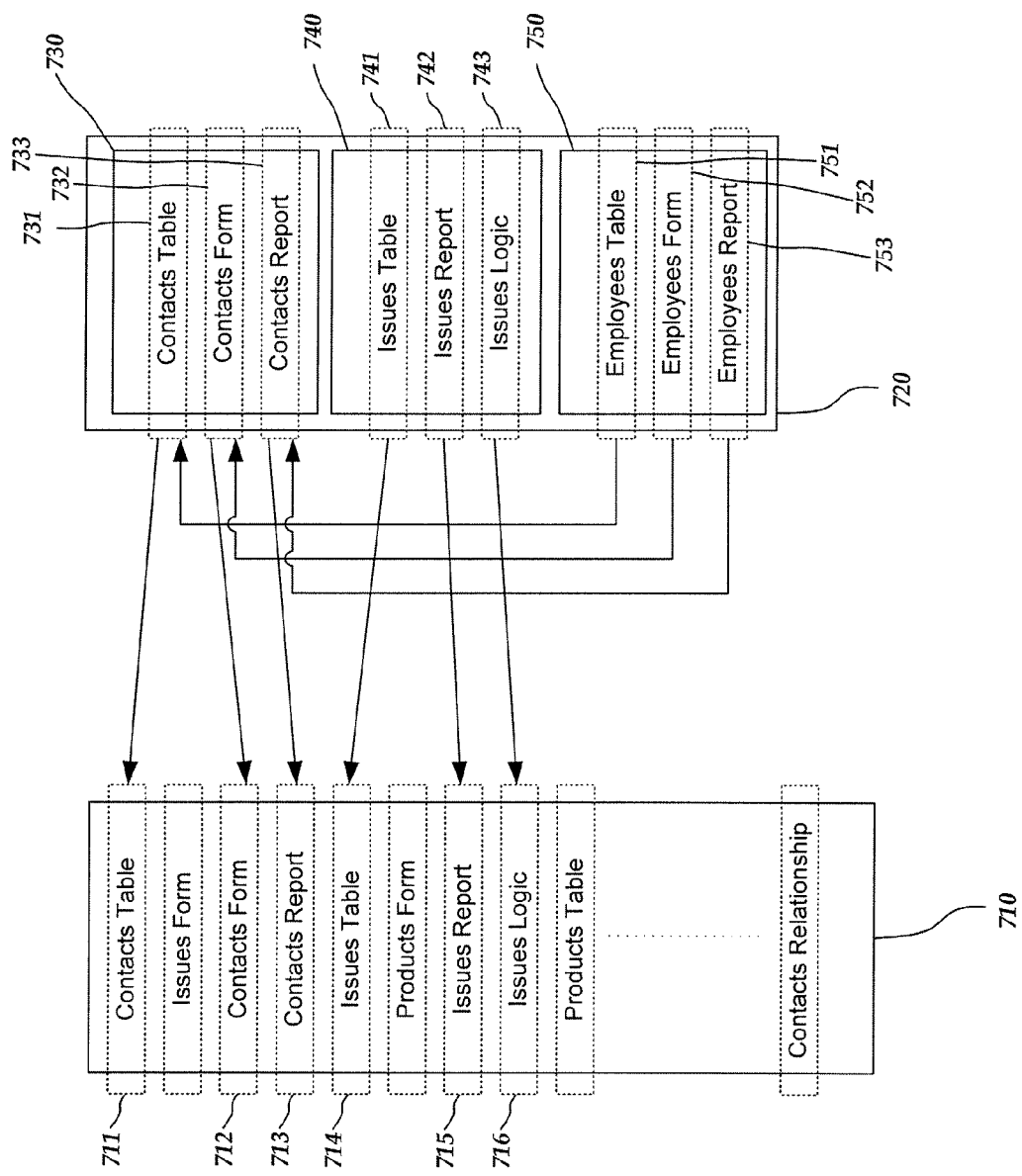

FIG. 7 shows an implementation of a components store 710 and an assembler 720 that include a different type of entry. The components store 710 is similar to the components store 410 of FIG. 4. The assembler 720 includes three database application frameworks. The assembler 720 includes a contacts database application framework 730 that is similar to the contacts database application framework 430 of FIG. 4. Specifically, the contacts database application framework 730 includes the entries 731, 732 and 733 that include direct pointers to components 711, 712 and 713 of the components store 710, respectively. The assembler 720 also includes an issues database application framework 740 that is similar to the issues database application framework 440 of FIG. 4. Specifically, the issues database application framework 740 includes three entries 741-743 that each point directly to three components 714-716 of the components store 710.

In some examples, a database application framework may include only direct pointers. In other examples a database application framework may include only indirect pointers. In still other examples a database application framework may include both direct and indirect pointers. In other cases, a database application framework may include group pointers. A group pointer references groups of application components or entries, rather than individual application components. Thus, a database application framework any include any combination of any type of pointer.

The assembler 720 also includes an employees database application framework 750 that defines another database application. In this case, it defines a database application that relates to employees. An employees database application may contain much of the same information as a contacts database application because both relate to people. For example, the contacts database may include name and address information for a person. An employees database may similarly include name and address information for a person. In some cases, where the contacts database contains a list of contacts that are also employees, the databases may contain essentially the same information. Therefore, an employees database application may be built from a contacts database application.

One database application framework may be built from another database application framework by including indirect entries instead of, or in addition to, direct entries. A direct entry is an entry that includes a pointer directly to a database component within a component store. For example, the contacts database framework 730 includes the contacts table entry 731. The contacts table entry is a direct entry because it points to the contacts table component 711 of the components store 710. On the other hand, an indirect entry includes a pointer to a database application entry within a database application framework. For example, the employees database application framework 750 includes an employees table entry 751. The employees table entry 751 is an indirect entry because it includes a pointer to the contacts table entry 731 of the contact database application framework 730, rather than to a component stored within the components store 710. Both direct and indirect entries may also include a change pointer. A change pointer is a pointer that not only references another component or entry, but also is associated with a transform, such as a change instruction. A direct change pointer is a change pointer associated with an existing database application component, while an indirect change pointer is a change pointer associated with a database application entry in the database framework.

More specifically, the employees database application framework 750 includes an employees table entry 751. The employees table entry 751 includes a pointer to the contacts table entry 731 of the contacts database application framework 730. The contacts table entry 731 in turn includes a pointer to the contacts table component 711 of the components store 710. Thus, through the contacts table entry 731, the employees table entry 751 of the employees database application framework 750 indirectly points to the contacts table component 711 of the components store 710.

The employees database application framework 750 also includes an employees form entry 752. The employees form entry 752 includes a pointer to the contacts form entry 732 of the contacts database application framework 730. The contacts form entry 732 in turn includes a pointer to the contacts form component 712 of the components store 710. Thus, through the contacts form entry 732, the employees form entry 752 of the employees database application framework 750 indirectly points to the contacts form component 712 of the components store 710.

Similarly, the employees database application framework 750 includes an employees report entry 753. The employees report entry 753 includes a pointer to the contacts report entry 733 of the contacts database application framework 730. The contacts report entry 733 in turn includes a pointer to the contacts report component 713 of the components store 710. Thus, through the contacts report entry 733, the employees report entry 753 of the employees database application framework 750 indirectly points to the contacts report component 713 of the components store 710.

Figure 8:
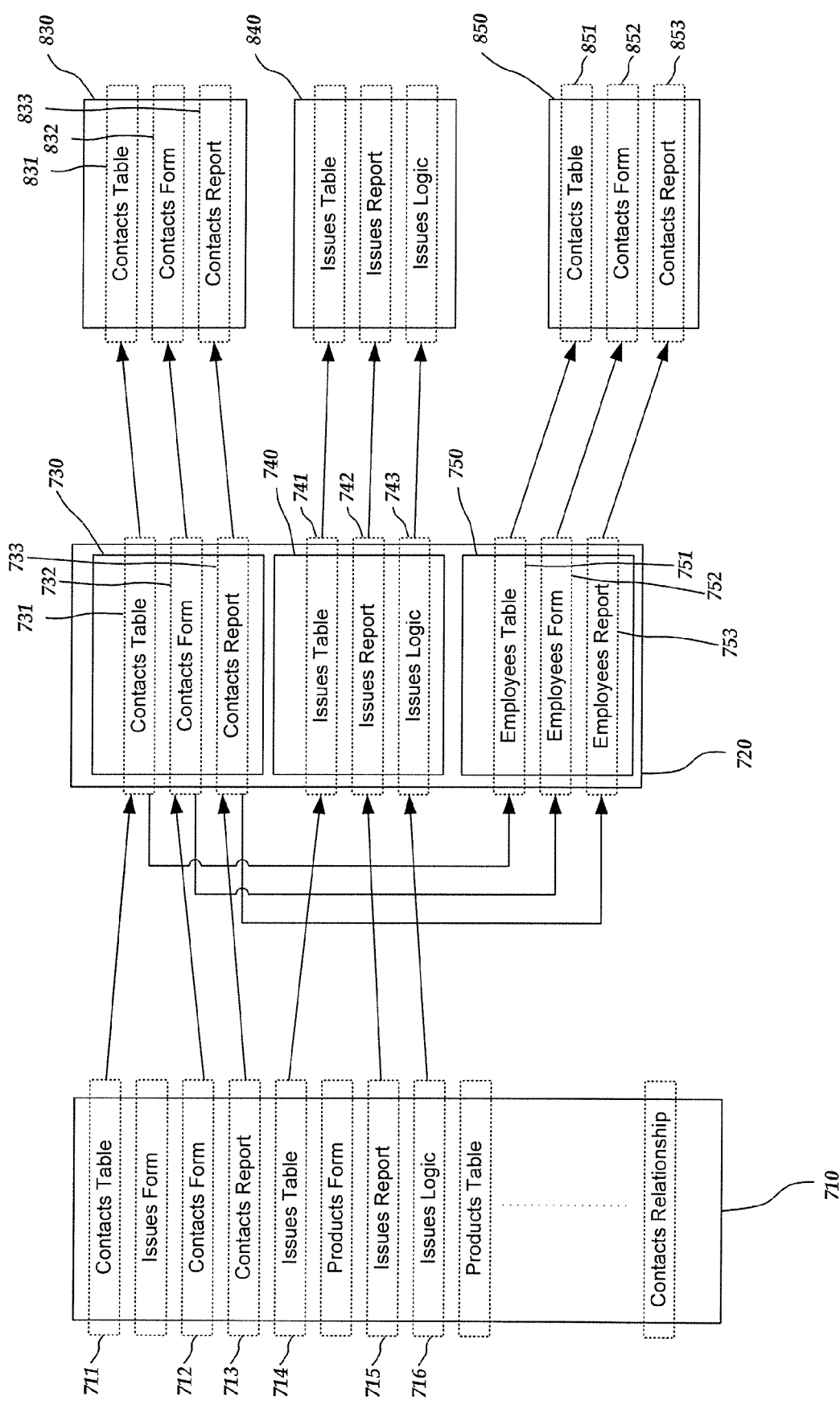

FIG. 8 shows an implementation of the components store 710 and the assembler 720 creating a contacts database application 830, an issues database application 840 and an employees database application 850. The contacts database application 830 and the issues database application 840 are each created similarly to the contacts database application 630 and the issues database application 640 of FIG. 6. Specifically, the contacts database application framework 730 and the issues database application framework 740 each include three entries 731-733 and 741-743 that reference three components 711-713 and 714-716, respectively, within the components store 710 Copies of the referenced components of the components store 710 are thus included within the database application frameworks 730 and 740.

The employees database application framework 850 includes three entries that each reference another database application framework, rather than components within the components store 710, and is therefore created differently. To create the employees database application 850, the referenced database application framework must first be created. In this case, the employees database application framework 750 includes three entries 751-753 that reference three entries 731-733, respectively, of the contacts database application framework 730. Thus, the contacts database application 830 must first be created, as described above. Once the contacts database application 830 has been created, and copies of the referenced components 831-833 have been created, the employees database application 850 may be created.

To instantiate each of the entries 751-753 of the employees database application framework 750, a copy of the contacts database components 831-833 are copied into the employees database application 850. For example, the employees table entry 751 in the employees database application framework 750 includes a pointer to the contacts table entry 731 in the contacts database application framework 730. The contacts table entry 731 references the contacts table component 711 in the components store 710, and is used by the assembler 720 to create the contacts table copy 831 in the contacts database 830. To create the employees database application 850, the assembler 720 uses the employees table entry 751 in the employees database application framework 750 that references the contacts table entry 731 in the contacts database application framework 730. The contacts table entry 731, in turn, references the contacts table component 711, which the assembler copies to create the contacts table copy 831 by copying the contacts table component 711 from the components store 710 into the contacts database application 830. The employees table entry 751 is in turn used by the assembler 720 to create the employees table copy 851 in the employees database application 850. The assembler 720 creates an additional contacts table copy 851 by copying the contacts table copy 831 from the contacts database application 830 into the employees database application 850. If it is desired to rename the entries in the employees database application 850 to designate the entries as "employees" entries rather than "contacts" entries, transforms can be applied as described below with reference to FIG. 10.

The employees form entry 752 includes a pointer to the contacts form entry 732. The contacts form entry 732 is used by the assembler 720 to create the contacts form copy 832. The assembler 720 creates the contacts form copy 832 by copying the contacts form component 722 from the components store 720 into the contacts database application 830. The employees form entry 752 is in turn used by the assembler 720 to create an additional contacts form copy 852. The assembler 720 creates the additional contacts form copy 852 by copying the contacts form copy 832 from the contacts database application 830 into the employees database application 850.

The employees report entry 753 includes a pointer to the contacts report entry 733. The contacts report entry 733 is used by the assembler 730 to create the contacts report copy 833. The assembler 730 creates the contacts report copy 833 by copying the contacts report component 733 from the components store 730 into the contacts database application 830. The employees report entry 753 is in turn used by the assembler 720 to create an additional contacts report copy 853. The assembler 720 creates the additional contacts report copy 853 by copying the contacts report copy 833 from the contacts database application 830 into the employees database application 850.

Figure 9:
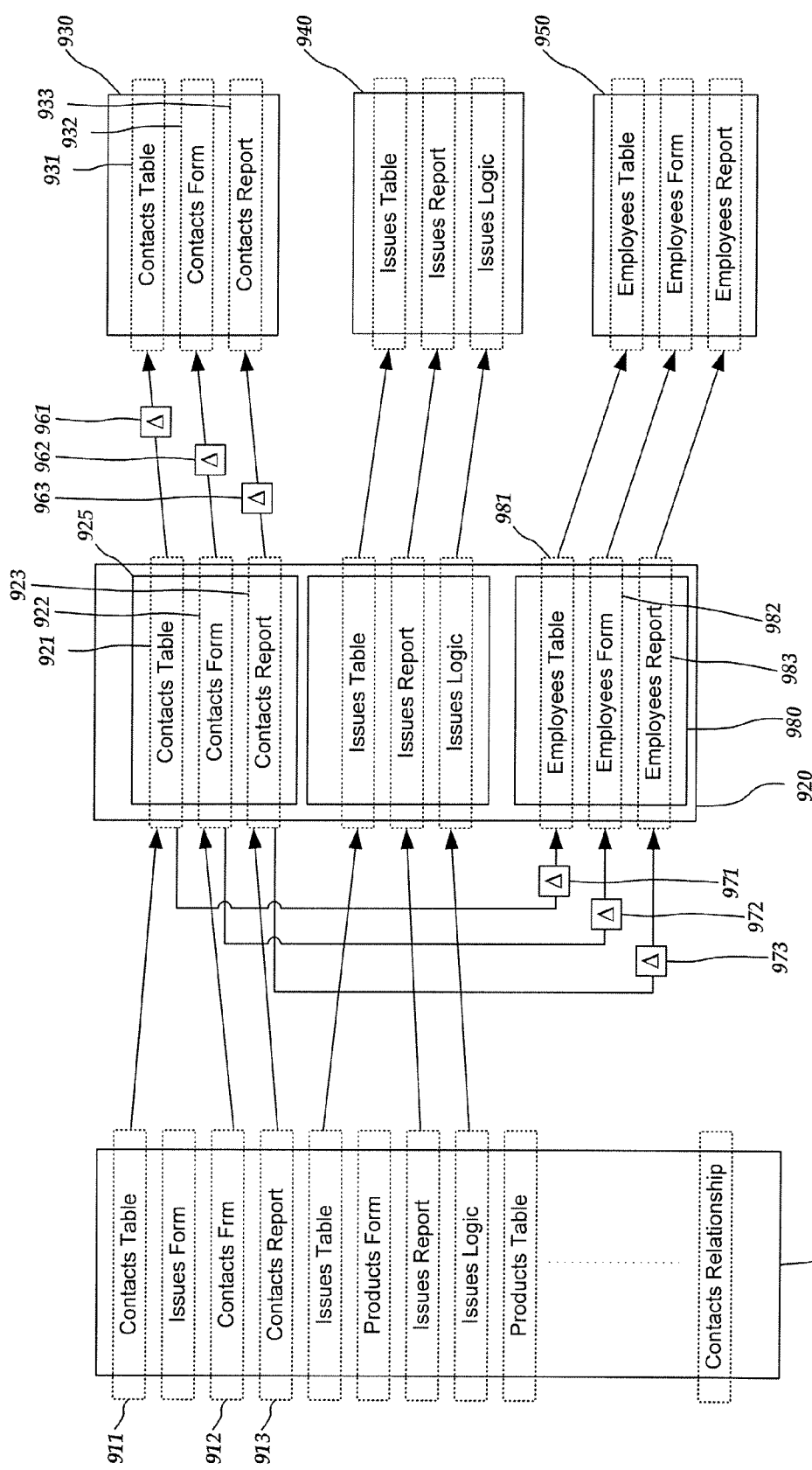

FIG. 9 shows an implementation of a components store 910 and an assembler 920 creating a contacts database application 930, an issues database application 940 and an employees database application 950. In this case, however, the assembler 920 applies transforms 961-963 when creating the contacts database application 930, and applies transforms 972-973 when creating the employees database application 950.

A transform may be a modification or change instruction that is applied when creating a copy of the entry into a resulting database application. For example, the contacts table entry 921 in the contracts database application framework 925 includes a pointer to the contacts table component 911 of the components store 910. In addition, the contacts table entry 921 is also associated with the transform 961 that is applied when a copy of the contacts table component 911 is created in the contacts database application 930. The transform 961 includes a modification instruction that may be applied during the creation of the copy of the contracts table component 911 to create the contacts table copy 931 of the contacts database application 930. Thus, the transform 961 defines differences between the original contacts table entry 911 and the contacts table copy 931.

In general, transforms may include instructions to make any modification to a component. In this case, for example, the transform 961 includes an instruction to resize the cells of the contacts table component 911. Thus, the contacts database application 930 includes a contacts table 931 that is similar to that of the contacts table component 911, but with resized cells. In this manner the transform 961 is used to create a database application having a different appearance than that of its constituent application components included within the components store 910.

The transform 962 includes an instruction to rename the contacts form component 912 from "Contacts Frm" to "Contacts Form" to correct for a typographical error of a name in the component 912. Thus, through use of the transform 962, typographical errors may be reduced in the output contacts database application 930. The transform 963 may include any instruction defining modifications to be applied to the contacts report component 913 when creating the contacts report copy 933.

The transforms 971 and 972 includes instruction to rename the contacts table copy 931 and the contacts form copy 932. In this case, however, the renaming functions of the transforms 971 and 972 are not being used to correct for an error, but to simply account for different uses of the same underlying components. Because a copy of the contacts table component 911 (via the contacts table entry 921 of the contacts database application framework 925 and the employees table entry 981 of the employees database application framework 980) is being used in the employees database application 950, the transform 971 includes an instruction to rename the copy of the contacts table from "Contacts Table" to "Employees Table" in the employees application database 950. Similarly, because a copy of the contacts form component 912 (via the contacts form entry 922 of the contacts database application framework 925 and the employees form entry 982 of the employees database application framework 980) is being used in the employees database application 950, the transform 972 includes an instruction to rename the contacts form entry from "Contacts Form" to "Employees Form" in the employees application database 950. Thus, the transforms 971 and 972 are used to convert the contacts table copy 931 and the contacts form copy 932 of the contacts database application into components suitable for use within the employees database application 950.

By way of further example, the transform 973 may include two instructions that are to be executed in a defined order. The transform 973 includes a first instruction to replace a string, such as "rptContacts" (not shown in FIG. 9) with another string, such as "Contacts." The transform 972 also includes a second instruction to delete all instances of the string "Contacts." Both the first and the second instruction include data that specifies which order the instructions should be executed. In this case, if the string replace function is executed before the delete function, the group of strings that are deleted will be altered. To maintain the intended result of the execution of the two instructions, the order the instructions of the transform 973 is defined. The transform 973 may include any instruction defining modifications to be applied to the contacts report copy 923 when creating the employees report copy 983.

Although the above description of transforms presents specific examples of transforms, in general, a transform may perform any transformation or alteration on a database application component. A transform may modify any feature or aspect of a database application component relating to both appearance and function. Further, rather than applying to a specific database application component, a transform may apply to a specific type of database application component such that when a database application is created by the assembler, the transform is applied to all database application component of the specific type. In some cases, transforms may apply to multiple types or groups of database application component. For example, a criterion may be defined such that all database applications components that match the criterion will have a transform associated with the criterion applied to them.

User Interface for Use in Developing Database Application Templates

Figure 10:
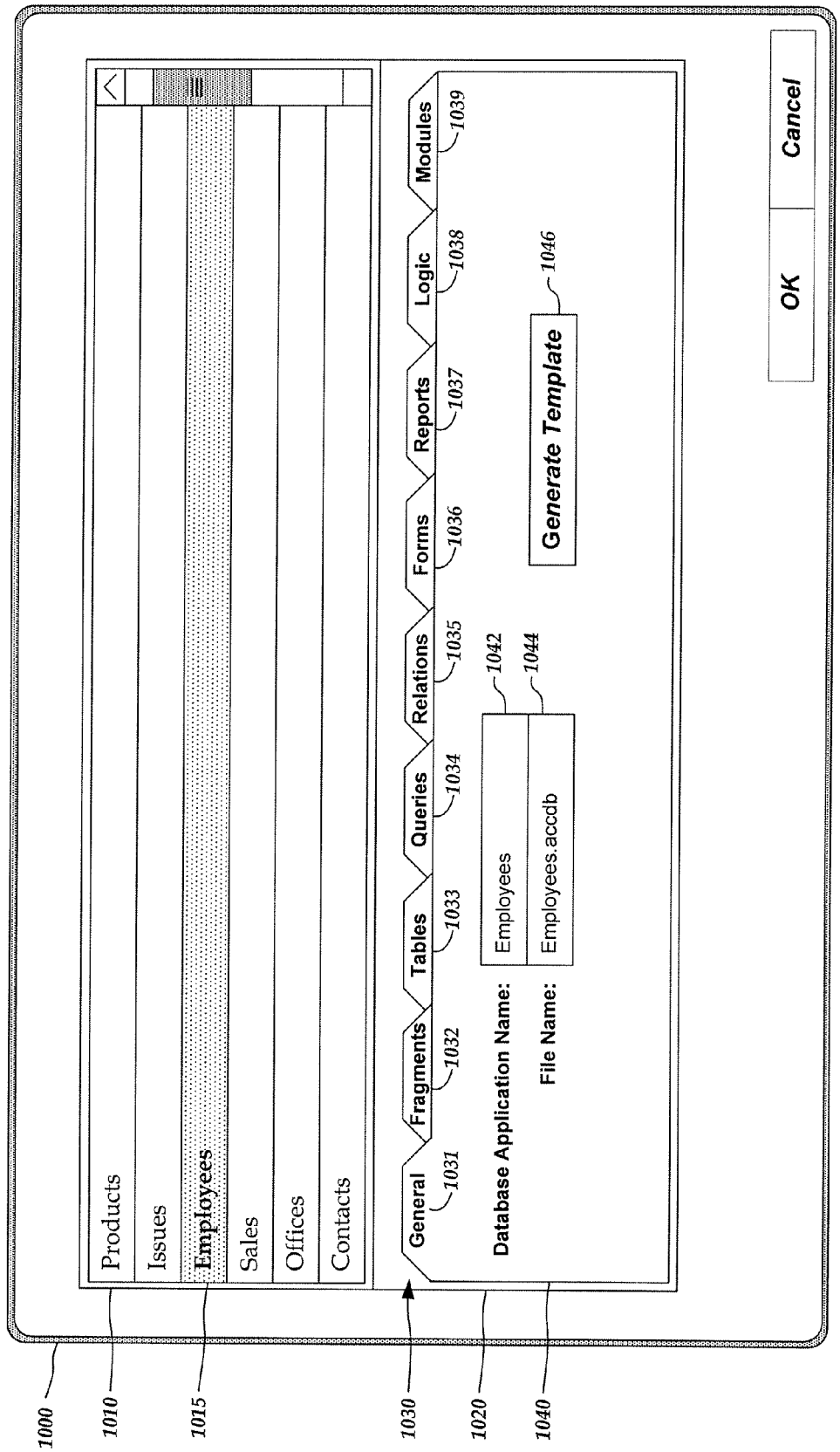
FIGS. 10-12 are diagrams illustrating an implementation of a user interface of a system for generating a database application.

FIG. 10 shows an implementation of a user interface 1000 for an assembler. The user interface 1000 may allow a user to create or modify a database application framework. The user interface 1000 includes a database application framework list 1010 that displays the database application frameworks created. From the list 1010, a user may select an application framework, such as an employees database application framework 1015 (labeled "Employees"), to be edited. Once selected, a control panel 1020 may present the user with controls to modify the selected database application framework.

The control panel 1020 presents the user with a series of tabs 1030. Each tab may be associated with a tab interface surface in which controls associated with a particular tab may be displayed. For example, the series of tabs 1030 includes a General tab 1031 that includes controls that apply generally to the employees application framework 1015. The General tab 1031 includes a tab interface surface 1040 to present controls and information. For example, the tab interface surface 1040 includes a database application name textbox 1042 where the name of the selected database application is displayed. This name may correspond to the name that is displayed in the database application framework list 1010. The tab interface surface 1040 also includes a filename textbox 1044 that displays the name of the file under which the database application framework is stored. In this case, the employees database application framework 1015 is stored in an "Employees.accdb" file. In addition, the tab interface surface 1040 includes a generate button 1046 to receive a user command to generate a database application based on the selected database application framework. In this case, a user may use a mouse cursor to click on the generate button 1046 to command the assembler to generate an employees database application based on the employees database application framework 1015.

In addition to the General tab 1031, the series of tabs 1030 may also include tabs associated with the different types of database application components that the database application framework includes. For example, a database application framework may include fragments, as described in more detail below. Thus, the series of tabs 1030 may include a Fragments tab 1032 to present the user with controls related to the fragments included within the database application framework. In addition to fragments, a database application framework may include a number of other types of database application components. For example, in this implementation of the user interface 1000, the series of tabs 1030 contains tabs for tables, queries, relations, forms, reports, logic, and modules. The series of tabs thus includes a Tables tab 1033, a Queries tab 1034, a Relations tab 1035, a Forms tab 1036, a Reports tab 1037, a Logic tab 1038 and a Modules tab 1039. Each of the tabs 1032-1039 includes an associated tab interface surface to display information and controls associated with the type of database application component of the particular tab. The interface surface associated with each tab may be displayed when the tab is selected by, for example, a user clicking the cursor of a mouse on the tab.

The functions of each individual tab may operate on information defined within other tabs. For example, tables included within the Tables tab 1033 may depend on fragments defined within the Fragments tab 1032. Thus, it may be difficult to properly define tables of the Tables tab 1033 without first having defined in the Fragments tab 1032 the fragments to be included in the database application framework. The order in which the tabs are presented may assist the user creating a database application framework in inputting the needed information. For example, the series of tabs 1030 may be presented in an order such that a selected tab may include functions that are independent of each of the tabs to the right of the selected tab. Thus, if a user moves through the tabs from left to right, a user may not encounter components that depend on information not yet defined.

Figure 11:
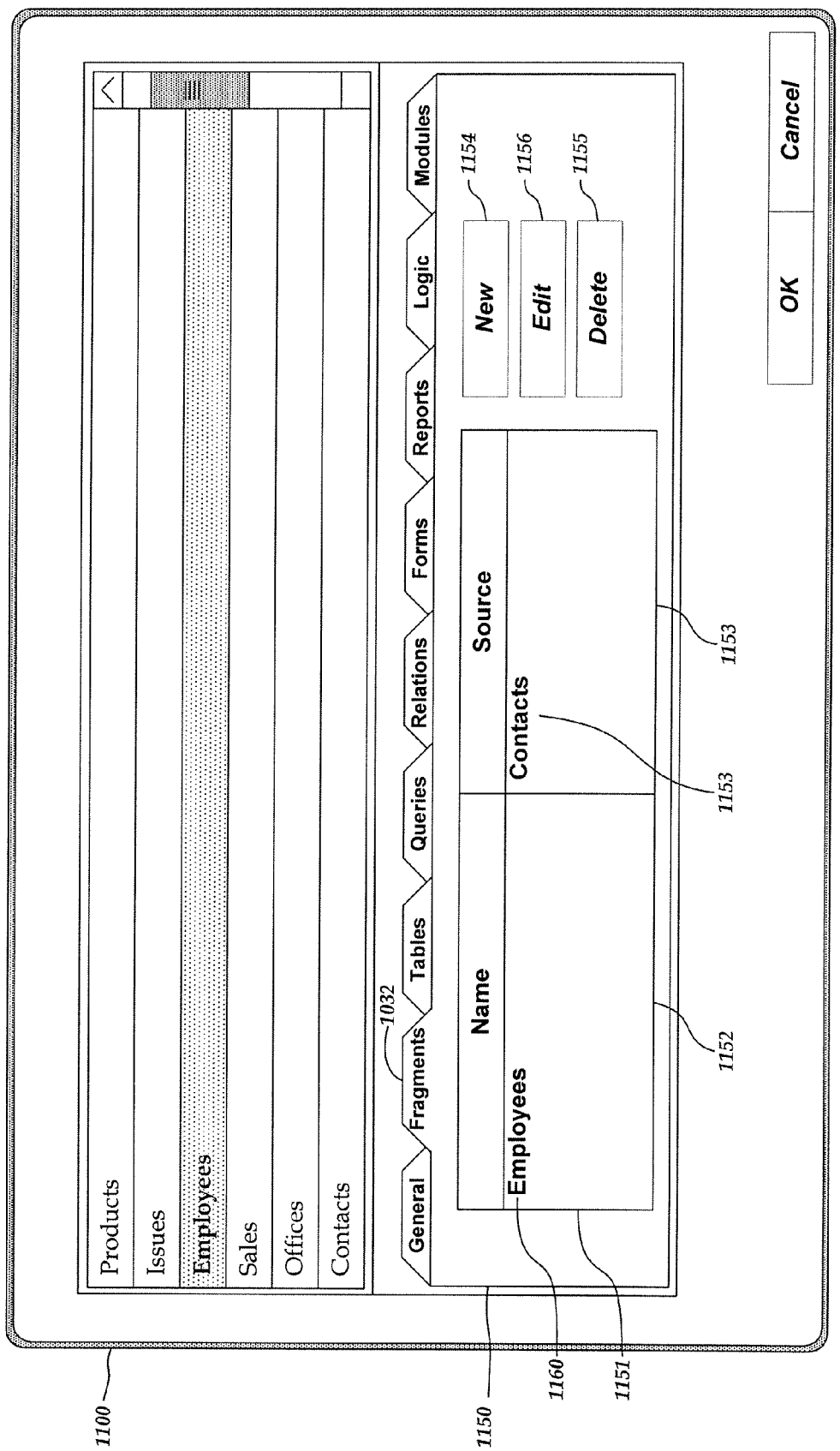

FIG. 11 shows an implementation of a user interface 1100 when the Fragments tab 1032 has been selected. Because the Fragments tab 1032 has been displayed, an interface surface 1150 associated with the Fragments tab 1032 is displayed and the interface surface 1040 (FIG. 10) associated with the General tab 1031 (FIG. 10) is no longer displayed. The interface surface 1150 includes controls associated with fragments of the employees database application framework 1015 (FIG. 10). A fragment includes an indirect pointer to another database application framework, rather than directly to a database application component within a components store. A fragment may be a reference to a database application framework already created by the assembler. The employees database application framework 710 of FIGS. 7-9 provides an example of a fragment.

Use of fragments allows a user to include within a database application framework, other database application frameworks already created. In some implementations fragment may include a single pointer to another database application framework. In other implementations a fragment may include a single pointer to another component of another database application framework. In still other implementations a fragment may include a plurality of pointers to each of the components of another database application fragment. In yet other implementations a fragment may include a combination of such indirect pointers and/or direct pointers.

The interface surface 1150 includes controls for creating, editing, and deleting fragments. A table 1151 is included within the interface surface 1150 that displays each fragment that is included within the particular database application framework selected. The table 1151 includes two columns: a fragment name column 1152 and a fragment source column 153. The fragment name column 1152 displays the names of included fragments. The fragment source column 1153 displays the locations to where the indirect pointers associated with the fragments point. In this case, the table 1151 includes an employees fragment 1160. The employees fragment 1160, labeled "Employees," points to a source 1161 that includes an application framework labeled "Contacts" 1161. Thus, the employees fragment 1160 is displayed in the fragment name column 1152 and the source 1161 is displayed in the fragment source column 1153. The individual fragments displayed in the table 1151 may then be selected by, for example, a user clicking a mouse cursor on a fragment listed.

The interface surface 1150 may also include buttons to further control the fragments. For example, the interface surface 1150 may include a new button 1154 that allows a user to create a new fragment. The interface surface 1150 may also include a delete button 1155 that allows a user to delete a selected fragment. The interface surface 1150 may also include an edit button 1156. A fragment may also include transforms as previously described with reference to FIG. 9.

As previously explained, a transform includes instructions that describe modifications to be applied to the source component in order to create the fragment. The edit button 1156 invokes an edit dialog box to present a user with further control of the transforms associated with a particular fragment.

Figure 12:
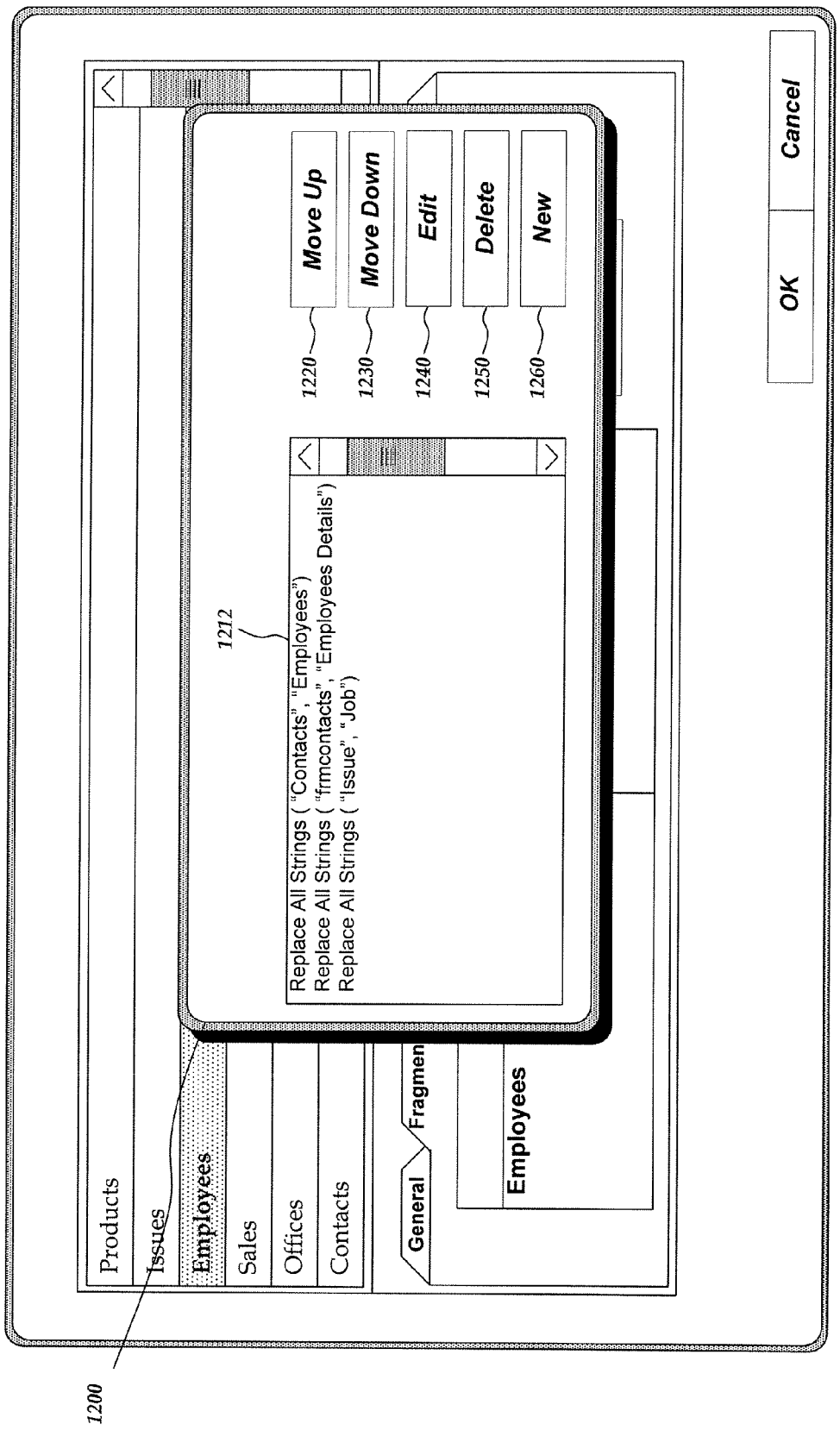

FIG. 12 shows an implementation of an edit dialog box 1200 for editing the employees fragment 1160 (FIG. 11). The dialog box 1200 includes a transform list 1212 that displays the individual transforms that are to be applied to the employees fragment 1160. In this case, the transform list 1212 includes three transforms that are to be applied to the employees fragment 1160. The transform list 1212 provides a number of functions. For example, in addition to displaying transforms, the transform list 1212 provides an interface allowing a user to select an individual transform by, for example, clicking a cursor of a mouse on a transform displayed in the transform list 1212. As explained above, transforms may be applied in a defined order. The transform list 1212 may also display the transforms in the order they are to be applied to the employees fragment 1160. Thus, the transform list 1212 may also indicate the order the instructions of the transforms are to be executed.

The dialog box 1200 also includes a series of buttons from controlling the transforms. For example, a move up button 1220 may allow a user to advance a transform's position in the transform list 1212, and thus modify the order in which the instructions associated with the transform will be executed. The dialog box 1200 may also include a move down button 1230 that allows a user to defer a transform's position in the transform list 1212. Further, the dialog box 1200 includes an edit button 1240 that allows a user to edit the instructions associated with a selected transform. A delete button 1250 is also included that allows a user to delete a selected transform. Finally, a new button 1260 is included that allows a user to create a new transform.

Processes for Creating Database Applications and Correcting Application

Figure 13:
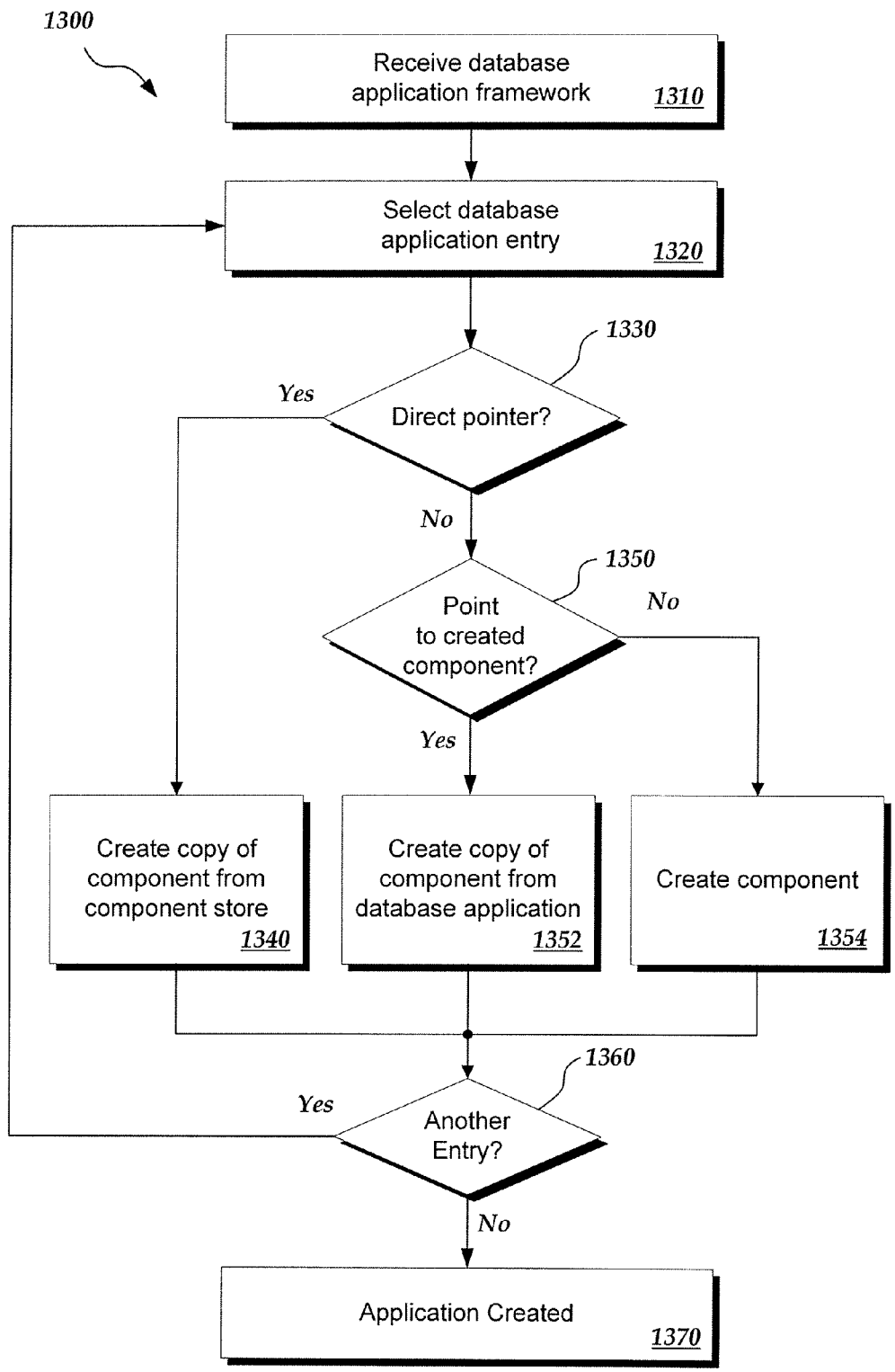
FIG. 13 is a flow diagram illustrating an implementation of a process for generating a database application.

FIG. 13 shows a flow diagram 1300 representing an implementation of a process using an assembler to create a database application. At 1310, a database application framework is received. The database application framework includes a plurality of database application entries. Some of the database application entries may include direct pointers that reference components stored in a components store, and other database application entries may include indirect pointers that references other database application entries or other indirect pointers. The database application framework may also include transforms associated with the database application entries.

At 1320, a database application entry to be instantiated is selected. At 1330, a determination is made whether the pointer associated with the selected database application entry is a direct pointer or an indirect pointer. If the pointer associated with the selected database application entry is a direct pointer, at 1340, the component referenced by the direct pointer is copied from the components store into the database application being created. When a transform is associated with the selected database application entry (not shown in FIG. 13), the instructions associated with the transform are executed to modify the referenced component when the copy is created.

If the pointer associated with the selected database application entry is not a direct pointer, at 1350, a determination is made whether the indirect pointer associated with the database application entry references a database application entry that has already been created. If the indirect pointer references a database application entry that has already been created, at 1352, the referenced database application entry that has already been created is copied from the database application into an output database application. When a transform is associated with the selected database application entry, the instructions associated with the transform are executed to modify the referenced component when the copy is created. If the indirect pointer references a database application entry that has not already been created, at 1354, the database application associated with the referenced database application entry is created by, for example, recursively executing the process.

At 1360, a determination is made whether the database application framework includes another database application entry to be created. If the database application framework does include another database application entry to be created, the flow diagram returns to 1320 and another database application entry is selected. If the database application framework does not include any additional database application entries to be created, at 1370, because all of the components of the database application framework have been copied into the database application, and the database application is completed.

Figure 14:
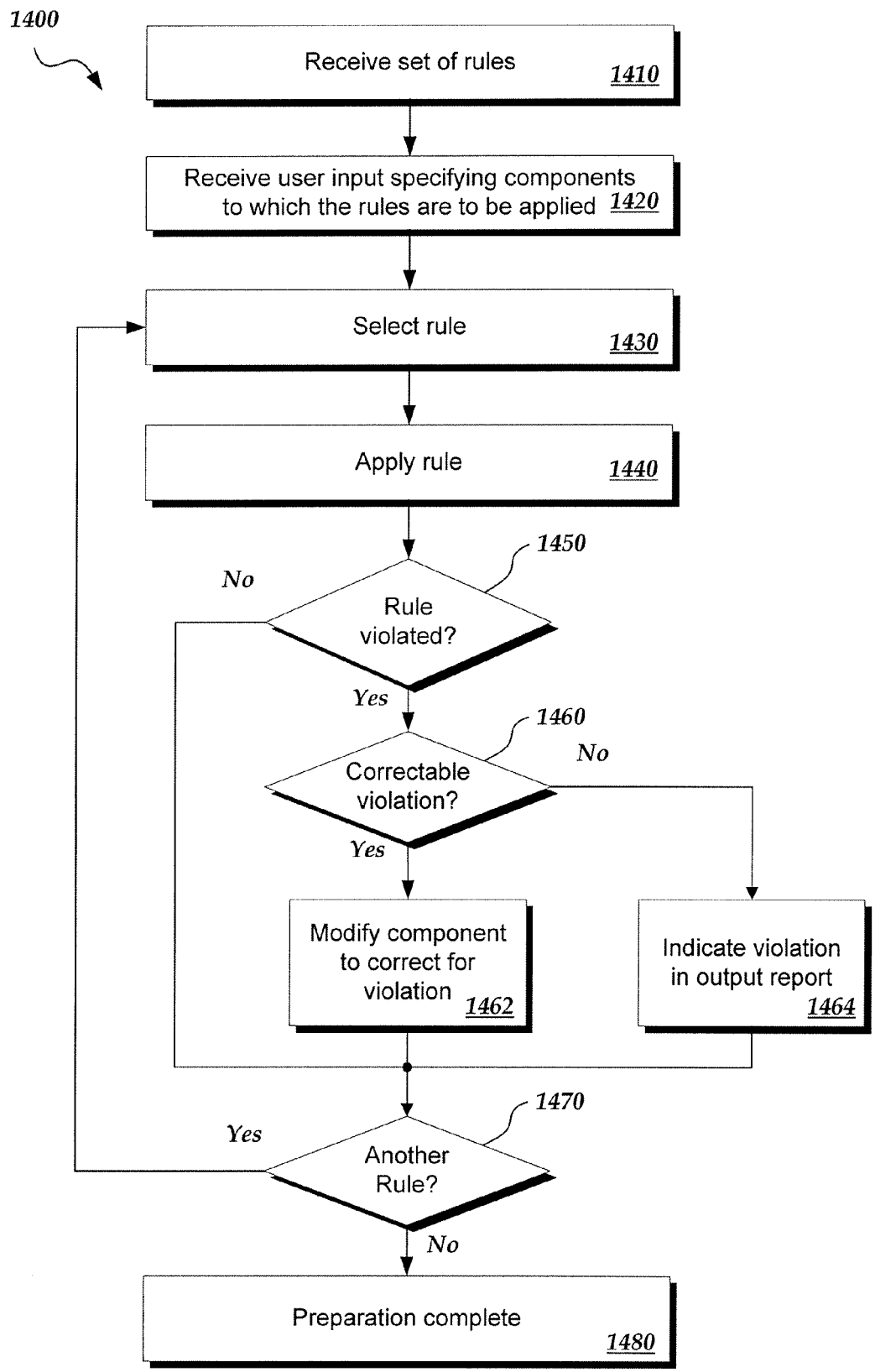
FIG. 14 is a flow diagram illustrating an implementation of a process for preparing database application components.

FIG. 14 shows a flow diagram 1400 representing an implementation of a process to locate and correct errors included within database application components. At 1410, a set of rules is received. The set of rules may define standards for database application component formatting, functionality and style. The set of rules may include rules with a variety of different application scopes. For example, some rules may apply to specific types of database application components, such as forms, reports and tables. Other rules may only apply to specific sections within database application components, such as only to header text, body text or footer text. The set of rules received may include instructions to correct database application components that do not conform to the rules.

At 1420, user input selecting a group of database application components to which the set of rules will be applied is received. For example, the user input may indicate that the rules are to be applied to a group of database application components included within a data store, a database application, or a database application template. At 1430, a rule to be applied to the database application components is selected. At 1440, the selected rule is applied to the database application components. At 1450, a determination is made whether the selected rule is violated by any of the database application components. When the selected rule is violated by the database application components, at 1460, a determination is made whether the violation of the rule is correctable. When the violation is correctable rule, at 1462, the database application component that violated the rule is modified such that it complies with the selected rule. When the violation is not correctable, at 1464, an indication of a violation of the selected rule is included within an output report. The output report may include a list of all rule violations of the database application components to where the rules are applied.

When it is determined at 1450 that the rule has not been violated, or once the violation has been corrected at 1462 or reported at 1464, the flow diagram 1400 proceeds to 1470. At 1470, a determination is made whether the set of rules includes another rule to be processed. When the set of rules includes another rule that has not been applied to the database application components, the flow diagram 1400 returns to 1430 and another rule is selected. On the other hand, when all of the rules of the set of rules have been processed, at 1480, the preparation of the database application components is complete. At this point, all of the violations of the rules that are correctable have been corrected, and an output report has been generated that indicates violation of the rules that were not correctable.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method comprising:
    receiving a first list of a plurality of database application components used in creating different database applications that are available in a first components store;
    displaying frameworks for selection within a User Interface (UI);
    receiving a selection of a first framework for editing from the frameworks that are displayed in the UI that identifies database application components selected for use in a first database application, wherein the database application components comprise: tables; queries; reports; relations; and forms;
    displaying a control panel including a plurality of selectable tabs that display controls that are used in modifying the first framework, the plurality of selectable tabs being presented in an order such that a selected tab includes functions that are independent of each of the plurality of selectable tabs following the selected tab and functions that are dependent on each of the plurality of selectable tabs preceding the selected tab, wherein the displayed controls includes selectable controls for different types of the database components that the first framework includes, wherein the selectable controls change based on the database application components that are included in a currently selected framework for editing;
    creating a reference for each of the database application components identified within the first framework to a corresponding database application component within at least one of: the first components store and a second framework that identifies database application components selected for use in a second database application;
    creating a copy of each of the database application components identified within the first framework that is associated with the first database application to include within the second database application; and
    creating the second database application using the copy of each of the database application components.

2. The computer-implemented method of claim 1, wherein each of the database application components further includes at least one of:
    a header;
    a footer;
    a control;
    a fragment;
    a conditional formatting statement;
    a programming component;
    a validation statement; and
    a module.

3. The computer-implemented method of claim 1, further comprising:
    identifying at least one existing database application component;
    creating at least one change instruction describing at least one transformation to be applied to the at least one existing database application component; and associating a change pointer with the change instruction, wherein the change pointer references the at least one existing database application component as modified by the change instruction.

4. The computer-implemented method of claim 3, wherein the at least one existing database application component includes at least one of a plurality of matching database application components matching at least one criterion.

5. The computer-implemented method of claim 3, further comprising:
applying the change instruction to transform the existing database application component; and
including the change pointer in the reference group to include the transformed existing database application component in the database application.

6. The computer-implemented method of claim 1, further comprising:
presenting a list of available database application components within the UI; and
receiving the at least one change instruction in the UI to be applied to at least one of the available database application components.

7. The computer-implemented method of claim 1, further comprising receiving a second list of second database application components available in a second components store, wherein at least one of the plurality of pointers references at least one of the second database application components, collecting the at least one of the second database application components in the reference group included in the database application.

8. A computer-implemented method comprising:
receiving a first list of database application components comprising tables; queries; reports; relations; and forms available in a first components store;
displaying frameworks for selection within a User Interface (UI);
receiving a selection of a first framework for editing from the frameworks that are displayed in the UI that identifies database application components selected for use in a first database application, wherein the database application components comprise: tables; queries; reports; relations; and forms;
displaying a control panel including a plurality of selectable tabs that display controls that are used in modifying the first framework, the plurality of selectable tabs being presented in an order such that a selected tab includes functions that are independent of each of the plurality of selectable tabs following the selected tab and functions that are dependent on each of the plurality of selectable tabs preceding the selected tab, wherein the displayed controls includes selectable controls for different types of the database components that the first framework includes, wherein the selectable controls change based on the database application components that are included in a currently selected framework for editing;
creating a plurality of direct pointers each referencing one of the database application components within the first components store for a first application framework;
creating a plurality of indirect pointers each referencing one of the plurality of direct pointers for a second application framework;
grouping the plurality of direct pointers into a first reference group;
grouping the plurality of indirect pointers to the direct pointers of the first reference group into a second reference group;
defining a first database application that includes the application components referenced by the plurality of the indirect pointers in the second reference group; and
creating a copy of each of the application components to include within the first database application using the direct pointers and indirect pointers;
creating the first database application using the copy of the each of the application components; and
when determined, creating a copy of each of the application components used in the first database application to include within a second database application.

9. The computer-implemented method of claim 8, wherein each of the database application components includes any of:
a header;
a footer;
a control;
a fragment;
a conditional formatting statement;
a programming component;
a validation statement; and
a module.

10. The computer-implemented method of claim 8, further comprising defining a second database application that includes the application components referenced by the plurality of the direct pointers in the first reference group.

11. The computer-implemented method of claim 8, further comprising:
identifying at least one existing database application component;
creating at least one change instruction describing at least one transformation to be applied to the at least one existing database application component; and
associating at least one of the plurality of indirect pointers to the at least one change instruction.

12. The computer-implemented method of claim 10, further comprising:
creating a group pointer referencing the first reference group;
grouping into a third group:
at least one direct referencing one of the database application components; and
the group pointer; and
defining a third database application that includes the referenced application components referenced by the third reference group.

13. The computer-implemented method of claim 8, further comprising:
creating at least one direct pointer change instruction describing at least one transformation to be applied to the at least one existing database application component;
associating at least one of the plurality of direct pointers to the at least one direct pointer change instruction;
creating at least one indirect pointer change instruction describing at least one transformation to be applied to the at least one database application component that is to be transformed; and
associating at least one of the plurality of indirect pointers to the at least one indirect pointer change instruction.

14. The computer-implemented method of claim 13, wherein defining a database application further includes executing one of the direct pointer change instructions to transform a referenced existing database application component and defining a first database application that includes the transformed application component.

15. The computer-implemented method of claim 14, wherein defining a database application further includes executing one of the indirect pointer change instructions to transform a transformed existing database application component and defining a first database application that includes the retransformed application component.

16. The computer-implemented method of claim 8, further comprising receiving a second list of second database application components available in a second components store, wherein at least one of the plurality of pointers references at least one of the second database application components, collecting the at least one of the second database application components in the reference group included in the database application.

17. A system comprising:
a memory for storing executable program code; and
a processing unit, functionally coupled to the memory, the processing unit being responsive to computer-executable instructions contained in the program code and operative to:
receive a first list of a plurality of database application components used in creating different database applications that are available in a first components store;
display frameworks for selection within a User Interface (UI);
receive a selection of a first framework for editing from the frameworks that are displayed in the UI that identifies database application components selected for use in a first database application, wherein the database application components comprise: tables; queries; reports; relations; and forms;
display a control panel including a plurality of selectable tabs that display controls that are used in modifying the first framework, the plurality of selectable tabs being presented in an order such that a selected tab includes functions that are independent of each of the plurality of selectable tabs following the selected tab and functions that are dependent on each of the plurality of selectable tabs preceding the selected tab, wherein the displayed controls includes selectable controls for different types of the database components that the first framework includes, wherein the selectable controls change based on the database application components that are included in a currently selected framework for editing;
create a reference for each of the database application components identified within the first framework to a corresponding database application component within at least one of: the first components store and a second framework that identifies database application components selected for use in a second database application;
create a copy of each of the database application components identified within the first framework that is associated with the first database application to include within the second database application; and
create the second database application using the copy of each of the database application components.

18. The system of claim 17, wherein each of the database application components includes at least one of:
a header;
a footer;
a control;
a fragment;
a conditional formatting statement;
a programming component;
a validation statement; and
a module.

19. The system of claim 17, wherein the processing unit is further operative to:
identify at least one existing database application component;
create at least one change instruction describing at least one transformation to be applied to the at least one existing database application component; and
associate a change pointer with the change instruction, wherein the change pointer references the at least one existing database application component as modified by the change instruction.

20. The system of claim 19, wherein the at least one existing database application component includes at least one of a plurality of matching database application components matching at least one criterion.

* * * * *